United States Patent
Bertoni et al.

(10) Patent No.: US 7,206,410 B2
(45) Date of Patent: Apr. 17, 2007

(54) CIRCUIT FOR THE INNER OR SCALAR PRODUCT COMPUTATION IN GALOIS FIELDS

(75) Inventors: Guido Bertoni, Cusano Milanino (IT); Luca Breveglieri, Seregno (IT); Pasqualina Fragneto, Vitulano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 899 days.

(21) Appl. No.: 09/974,176

(22) Filed: Oct. 10, 2001

(65) Prior Publication Data

US 2003/0068037 A1 Apr. 10, 2003

(51) Int. Cl.
*G06F 7/00* (2006.01)
(52) U.S. Cl. .................. 380/255; 708/492
(58) Field of Classification Search .............. 380/262, 380/28, 255; 708/492, 491, 490
See application file for complete search history.

(56) References Cited

U.S. PATENT DOCUMENTS

| | | | | |
|---|---|---|---|---|
| 4,873,688 A | * | 10/1989 | Maki et al. | 714/784 |
| 5,822,336 A | * | 10/1998 | Weng et al. | 714/784 |
| 6,049,815 A | * | 4/2000 | Lambert et al. | 708/492 |
| 6,141,420 A | * | 10/2000 | Vanstone et al. | 380/30 |
| 6,349,318 B1 | * | 2/2002 | Vanstone et al. | 708/492 |
| 6,366,940 B1 | * | 4/2002 | Ono et al. | 708/491 |
| 6,377,969 B1 | * | 4/2002 | Orlando et al. | 708/492 |
| 6,389,442 B1 | * | 5/2002 | Yin et al. | 708/492 |
| 6,523,054 B1 | * | 2/2003 | Kamijo | 708/492 |
| 6,581,084 B1 | * | 6/2003 | Romain et al. | 708/492 |
| 6,662,346 B1 | * | 12/2003 | Yu et al. | 716/2 |
| 6,701,336 B1 | * | 3/2004 | Shen et al. | 708/492 |

OTHER PUBLICATIONS

Interim Guidelines for Examination of Patent Applications for Patent Subject Matter Eligibility, OG 142 Notice Nov. 2005.*

* cited by examiner

*Primary Examiner*—Gilberto Barron, Jr.
*Assistant Examiner*—Ellen C. Tran
(74) *Attorney, Agent, or Firm*—Lisa K. Jorgenson; Allen, Dyer, Doppelt, Milbrath & Gilchrist, P.A.

(57) ABSTRACT

A circuit for computing the inner of scalar product of two vectors in a finite Galois field defined by a generator polynomial, wherein each vector includes at least two elements belonging to said finite field, comprises one or more look-up tables storing digital words indicative of said possible combinations and said possible reductions. The digital words in question are defined as a function of the second elements of said vectors and the generator polynomial of the field. The input register(s) and the look-up table(s) are configured to co-operate in a plurality of subsequent steps to generate at each step a partial product result identified by at least one of digital word addressed in a corresponding look-up table as a function of the digital signals stored in the input register(s). The circuit also includes an accumulator unit for adding up the partial results generated at each step to give a final product result deriving from accumulation of said partial results.

21 Claims, 2 Drawing Sheets

CIRCUIT FOR THE INNER OR SCALAR PRODUCT COMPUTATION IN GALOIS FIELDS

FIELD OF THE INVENTION

The present invention relates to computing systems and was developed with specific attention being paid to cryptographic systems (cryptosystems) based on the use of elliptic curves.

BACKGROUND OF THE INVENTION

Elliptic Curve Cryptosystems or, briefly, ECC, appear to be particularly promising for use in smart cards where intrinsic restrictions exist in terms of silicon area and power consumption, while processing time constraints are also to be taken into account.

ECCs make it possible to reach the same level of security of RSA systems using keys of about 200 bits. Operations on elliptic curves are based on the arithmetic of finite Galois fields. Essentially, two basic operations are necessary to implement such a cryptosystem: multiplication and addition in finite fields. While addition is a simple bit-wise X-OR operation, multiplication is inevitably more complex.

For a general review on ECC systems, reference may be made e.g. to M. Rosing, "Implementing Elliptic Curve Cryptography", Manning Publications, 1999; A. Menezes, "Elliptic Curve Public Key Cryptosystems", Kluwer Academic Publ., Boston, 6th Printing, 1998; R. Lidl, H. Niederreiter, "Introduction to Finite Fields and their Applications" Cambridge Univ. Press, 1986.

Previous research work concerning practical implementation of ECCs at hardware level are based on co-processor design. A co-processor is essentially a sort of additional arithmetic-logical unit (ALU) adapted to implement the two basic operations of addition and multiplication.

For a general review of previous activity in that area reference can be made e.g. to M. Hasan, "Look-up Table-Based Large Finite Field Multiplication in Memory Constrained Cryptosystems", in IEEE Trans. on Comp., vol. 49, no. 7, July, 2000; G. Orlando, C. Paar, "A Super-Serial Galois Field Multiplier for FPGA's and its Application to Public-Key Algorithms", 7th Annual IEEE Symp. on Field-Progr. Custom Computing Machines, 1999, Page(s): 232–239; C. Paar, "Implementation Options for Finite Fields Arithmetic for Elliptic Curve Cryptosystems", Proc. 3rd Workshop on Elliptic Curve Cryptosystems, ECC '99, Waterloo, Ontario, Canada, November, 1999; L. Song, K. K. Parhi, I. Kuroda, T. Nishitani, "Low-Energy Programmable Finite Field Data Path Architectures", Proc. ISCAS '98, Vol. 2, 1998, Page(s): 406–409; A. G. Wassal, M. A. Hasan, M. I. Elmasry, "Low-Power Design of Finite Field Multipliers for Wireless Applications", Proc. 8th Great Lakes Symposium on VLSI, 1998, Page(s): 19–25; H. Wu, M. A. Hasan, "Low Complexity Bit-Parallel Multipliers for a Class of Finite Fields", in IEEE Trans. on Comp., Vol. 478, August, 1998, Page(s): 883–887; L. Song, K. K. Parhi, "Efficient Finite Field Serial/Parallel Multiplication", Proc. ASAP '96, 1996, Page(s): 72–82; M. Furer, K. Mehlhorn, "AT$^2$ Optimal Galois Field Multiplier for VLSI", in IEEE Trans. on Comp., Vol. 389, September 1989, Page(s): 1333–1336.

SUMMARY OF THE INVENTION

While satisfactory from a general viewpoint, most prior art solutions still extensively suffer from inherent disadvantages in terms of circuit complexity, power consumption and computational speed. This last cited point is particularly significant as regards the so-called kP operation on elliptic curves, which in fact represents the kernel of any ECC cryptosystem.

The object of the invention is thus to provide a new improved solution which overcomes the intrinsic disadvantages of the prior art.

According to the invention, such an object and other additional objects are achieved by means of a process and system having the features set forth in the claims which follow.

Essentially, the basic idea underlying the invention is to perform in a single step two standard multiplication operations and the addition of the two results so obtained, instead of using twice a standard multiplier and eventually an adder. In fact, using elliptic curves in cryptography requires two operations to be carried out on the points of the curve: addition of two points and doubling of a point. Both require some basic operations in Galois fields, like addition, multiplication, and—possibly—division and squaring. In the design phase some basic choices must therefore be made such as e.g. the choice of the basis of the elements in the fields (polynomial basis, normal basis, dual basis, triangular basis or "ghost bit" basis) and the choice of the co-ordinates for representing the elliptic curve (affine, homogeneous, Jacobian, etc.).

In fact, by using homogeneous (projective) coordinates to describe the curve, point addition and point doubling can be executed upon the curve without resorting to division in the underlying Galois field. This is important because division is the most complex operation. Using homogeneous co-ordinates and performing some grouping of basic operations it is thus possible to use the inner product operation to perform the kP operation on the whole elliptic curve.

BRIEF DESCRIPTION OF THE DRAWINGS

The invention will now be described, by way of example only, in connection with the enclosed drawings, wherein.

DETAILED DESCRIPTION OF PREFERRED EMBODIMENTS OF THE INVENTION

Essentially, the present invention aims at providing a hardware device (such as a functional unit or a co-processor) adapted to be integrated in an embedded systems (for instance a smart-card) in order to render public key cryptographic operations faster.

Specifically, the operation to be implemented is:

$$E(x)=((A(x) \times B(x))+C(x) \times D(x)) \bmod \phi(x)$$

where $A(x)$, $B(x)$, $C(x)$, $D(x)$, and $E(x)$ are elements of finite field $GF(2^n)$, or polynomial or order n−1 having one bit coefficients. Any of this can also be identified as a sequence of n bits. Usually $150 \leq n \leq 250$ for cryptographic applications using elliptic codes (ECC).

The representation of the finite field $GF(2^n)$ is given in a "polynomial basis" or a "standard basis". Choosing the representation of the field corresponds to fixing the polynomial of order $n \geq 1$ which generates the field itself. Such generator polynomial is designated $\phi(x)$. The generator polynomial $\phi(x)$ is fixed, and is changed only if the representation of the field is changed, which happens only if the system is reconfigured, which is seldom the case.

The result $E(x)$ is the inner product (scalar product) of two vectors each having a first and a second element belonging to the finite field $GF(2^n)$. The inner (scalar) product operation can be easily generalized to vectors having three or more elements belonging to the finite field $GF(2^n)$.

One could well write:

$$E(x)=([A(x),B(x)][C(x),D(x)]) \bmod \phi(x)$$

wherein represents the inner (scalar) product of two vectors. This formal representation is thoroughly equivalent to the previous one.

The operators + and × denote, respectively: addition in $GF(2^n)$, which is carried out by means of simple array of n XOR gates having two input, and multiplication in $GF(2^n)$, which corresponds to computing the product of two polynomials, in current algebraic sense, followed by "reduction" with respect to the generator polynomial $\phi(x)$, that is computing the remainder of the division with respect to $\phi(x)$. Such reduction operation is indicated with the symbol "mod $\phi(x)$": for instance "$F(x)=A(x) \times B(x) \bmod \phi(x)$" designate calculation of the current product of two polynomials $A(x)$ and $B(x)$, each of order n−1, with a result of order 2n−2, followed by computing the remain of the division by the polynomial $\phi(x)$, of order n. The final result is a polynomial of order n−1.

Figure 2:
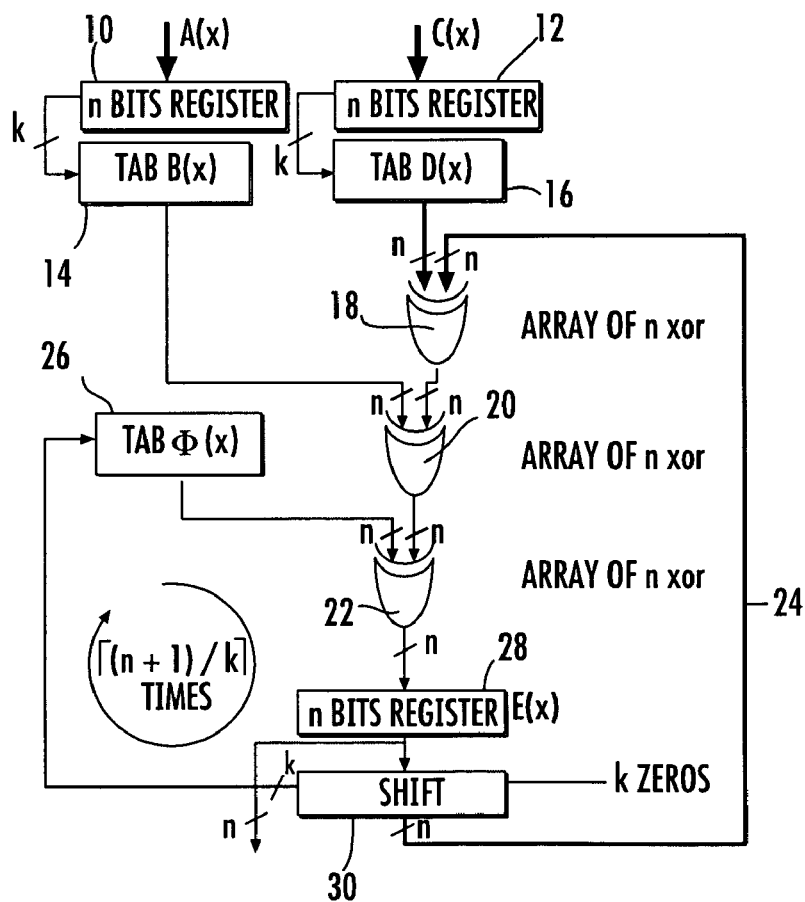
FIG. 2 is a schematic block diagram of a circuit according to one embodiment of the present invention.
Figure 3:
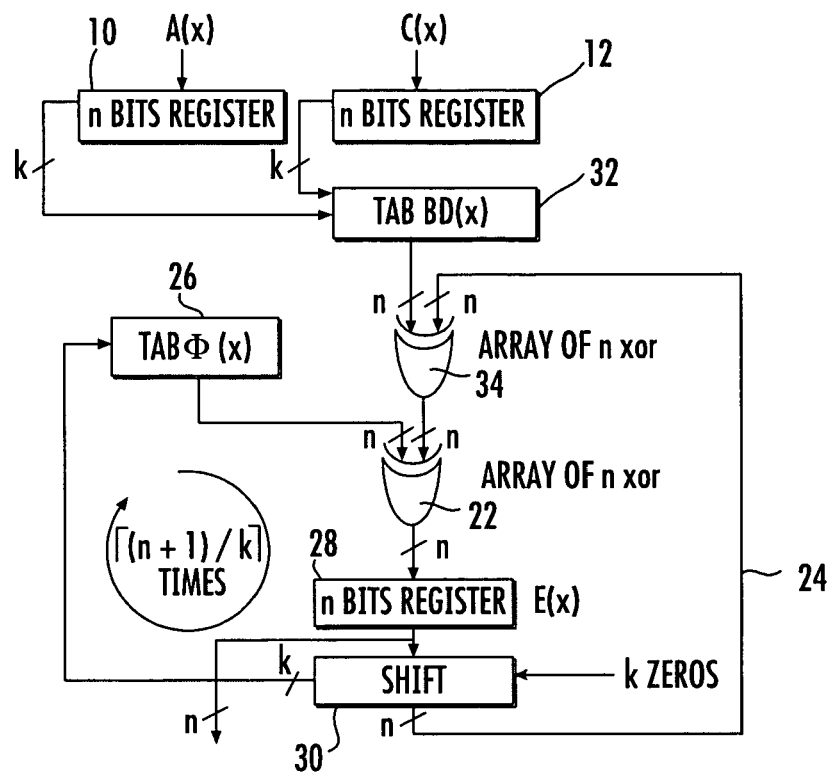
FIG. 3 is schematic block diagram of a circuit according to another embodiment of the invention.
Figure 4:
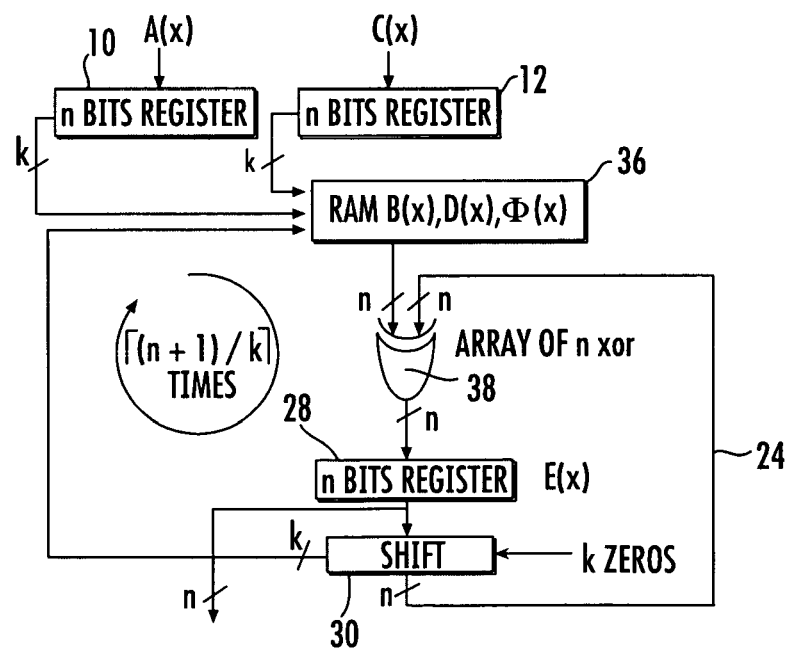
FIG. 4 is schematic block diagram of a circuit according to yet another embodiment the invention.

Essentially, the various exemplary embodiments of the invention shown in FIGS. 2, 3 and 4 relate to circuits which carry out the captioned operation in compact way, without de-composing it into separate multiplication steps followed by a sum. In actual fact, the inner (scalar) product operation of two vectors having elements in a finite field $GF(2^n)$ is performed in some formulations of the algorithm or operation designated "kP" which constitutes the core of a ECC cryptographic system.

Figure 1A:
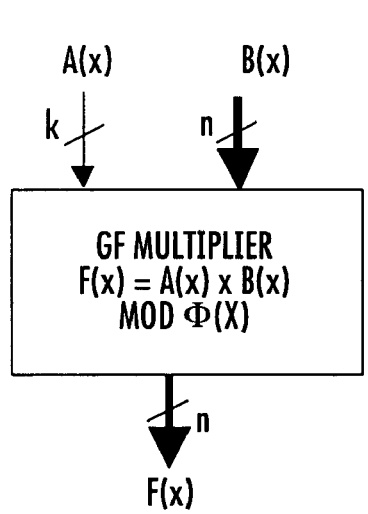
FIG. 1A is schematic block diagram of a computation involving elements of a finite or Galois field (GF) using ordinary multiplication as in the prior art.

FIG. 1A shows an ordinary multiplier according to the prior art. In order to implement the inner (scalar) operation of two vectors each including a first and a second element, two of such ordinary multipliers would be required, one for the ordinary product $(A(x) \times B(x)) \bmod \phi(x)$ and the other one for the ordinary product $(C(x) \times D(x)) \phi(x)$, plus a final adder.

Figure 1B:
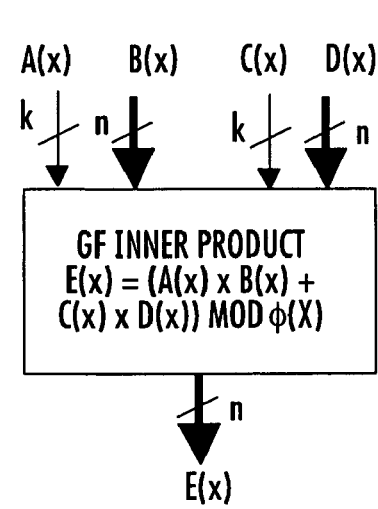
FIG. 1B is schematic block diagram of a computation involving elements of a finite or Galois field (GF) according to the present invention.

FIG. 1B by contrasts shows a functional unit which computes the inner (scalar) product as a single operation, without de-composing it in simpler operations to be combined in parallel or in a cascaded arrangement and to be implemented via ordinary multipliers in accordance with the invention.

In general, factors or operands $A(x)$, $B(x)$, $C(x)$ and $D(x)$ could be provided in serial or parallel format. In practice, each factor is a sequence of n bits. Serial operation involves providing one bit at a time, while parallel operation requires all the n bits to be provided simultaneously.

Purely serial architectures have a throughput too low for cryptographic applications. Fully parallel architectures give rise to circuits which are too complex for embedded systems (one as to keep in mind that, typically n=200 bits).

It is therefore advisable to resort to digit-serial architectures, wherein some factors are provided in parallel, while other are provided serially in groups of $k \geq 1$ bit at a time (for K=1 one has the serial-parallel case, for k=n one has the fully parallel case). In that case a balance is struck between circuit complexity and throughput.

In the preferred embodiment of the present invention, operands $B(x)$ and $D(x)$ are provided in a parallel format, while operands $A(x)$ and $C(x)$ are provided in groups of k bits at a time. The result $E(x)$ is finally produced in a parallel format.

The digit-serial approach is particularly suited for using combination with look-up tables. In such tables are initialized by memorising some partial computation results. Subsequently, the contents of these tables is read and re-used with purpose of making the whole computation faster. In certain cases the table contents may be fixed, or may vary infrequently. In these cases, table initialization can be dispensed with or carried out only from time to time, thus having low impact on circuit operation.

The digit-serial approach based on the use of look-up tables has been originally proposed in the first work by M. Hasan cited in the foregoing. In the captioned work only multiplication, and not calculation of inner (scalar) product of vectors of two or more elements is considered.

In the following, three different architectural embodiments are considered.

In a first embodiment shown in FIG. 2, references 10 and 12 designate two n-bit registers adapted to receive binary digits $A(x)$ and $C(x)$, each representative of the first element of one of the two vectors to be multiplied.

Conversely, reference numerals 14 and 16 designate two look-up tables TAB $B(x)$ and TAB $D(x)$ storing a first set of digital words derived—as better explained in the following—from the factors $B(x)$ and $D(x)$, each representative of the second element of one of the two vectors to be multiplied, and the generator polynomial $\phi(x)$.

Reference numeral 26 designates a further look-up table TAB $\phi(x)$ storing a second set of digital words derived—as better explained in the following—from the generator polynomial and representative of the mod $\phi(x)$ reduction function.

Look-up tables 14, 16 and 26 are preferably comprised of solid state memories such as RAMs, ROMs or EPROMs, each including words n bits each.

Reference numerals 18, 20 and 22 designate three arrays of n XOR gates with two inputs for each gate. Reference numerals 28 and 30 designate further n bit registers.

Each register is adapted to perform a k bit shift at a time. The shift unit of the result register $E(x)$ is shown explicitly.

Finally, reference numeral 24 designates a feedback line from register 30 to one of the inputs of array 18.

Look-up table TAB $\phi(x)$ implemented by memory 26 is fixed once the generator polynomial of the field is chosen, which is fixed. Therefore, memory 26 is preferably a ROM or EPROM with $2^k$ words of n bit each.

The i-th word with $0 \leq i \leq 2^k-1$ of table $\phi(x)$ is obtained by considering only the n least significant bits of the polynomial including n+k coefficient obtained by the previous calculation: $\phi(x) \times P(i)$, this being a product without reduction. By $P(i)$ the polynomial of order between 0 and k−1 (extremities included) is meant as having exactly k coefficients, wherein the serious of coefficients represents the natural binary expansion of integer i.

In view of operation, tables TAB $B(x)$ and TAB $D(x)$ in memories 14 and 16 are first initialized. Each look-up table is a RAM with $2^k$ words of n bits each.

The i-th word, with $0 \leq 1 \leq 2^k-1$ of TAB B(x) is obtained in the way: $B(x) \times P(i) \bmod \phi(x)$.

The i-th word, with $0 \leq 1 \leq 2^k-1$, of TAB D(x) is obtained in the following way; $D(x) \times P(i) \bmod \phi(x)$.

Shift registers 10 and 12 are loaded in parallel with operands A(x) and C(x). Register E(x) is initialized to 0.

Operands A(x) and C(x) are shifted by k positions. The k most significant bits of operands A(x) and C(x) are extracted and sent as addresses to tables 14 and 16, respectively. The two n-bit words stored in these tables at those addresses are read out.

The contents of register 28 are shifted by k positions. The k most significant bits are extracted whereas k "0" bits are inserted in the k least significant positions of the register. The k most significant bits of partial result E(x) are sent as an address to table 26. The corresponding n bit word stored therein is read out.

The three n bit words read out from tables 14, 16 and 20, respectively are added to the current contents of parallel register 28.

If operands or factors A(x) and C(x) have not been completely scanned a further shift operation is carried out as described in the foregoing. When such scanning is completed, register 28 contains the final result.

Consequently, the partial products A×B and C×D are not computed separately by the inner product functions unit of the invention. Instead, the inner product unit computes a mix of partial results and then accumulates them to form the final result. It is not possible to point out any internal component of the inner product unit where the two mentioned multiplications are carried out separately.

Instead of executing one partial addition with the factor B in the main loop of the multiplication, two partial additions—with the factors B(x) and D(x)—are executed in parallel and the partial result thus obtained is reduced.

Consequently, the architecture shown in FIG. 2, contains three look-up tables (namely RAMs 14 and 16 as well as ROM 26). In terms of the necessary storage resources required, this solution does not properly represent an improvement over serially using a standard finite field multiplier and one adder. The arrangement shown in FIG. 2 is however faster, due to the parallel processing adopted for computing the two products $A(x).B(x)$ and $C(x).D(x)$.

The arrangement shown in FIG. 3 illustrates an embodiment alternative to the one shown in FIG. 2.

In the arrangement of FIG. 3 the inner product is computed by resorting to a single general look-up table TAB BD(x) which in fact incorporates the functions of distinct look-up tables for TAB B(x) and TAB D(x).

In the block diagram of FIG. 3 components and elements corresponding to those already shown and described in connection with FIG. 2 have been indicated with the same reference numeral already appearing in FIG. 2.

Essentially, in the arrangement of FIG. 3, the two look-up tables comprising RAMs 14 and 16 of FIG. 2 are consolidated to a single look-up table hosted by a single RAM 32. Similarly, the two X-OR arrays 18 and 20 of the diagram of FIG. 2 are consolidated to a single homologous array designated 34.

Table 32, designated TAB BD(x) contains all the sums two-by-two, in all possible ways, of the digital words of the look-up tables 14 and 16 of FIG. 2.

Operation of the embodiment shown in FIG. 3 is substantially similar to that of the embodiment of FIG. 2. Look-up table 32 is initialized, the h-th word with $0 \leq i, j \leq 2^{2k}-1$ being obtained as a combined digital word in the following way: (word of index i table TAB B(x))+(word of index j of TAB D(x)), where integers i, j with $0 \leq i, j \leq 2^k-1$ are related to h in the following way: $h = 1+j \times 2^k$.

Also in this case, factors A(x) and C(x) are shifted by k positions. The k most significant bits of A(x) and C(x) are extracted and concatenated to obtain a $2^k$ bit word. This word is sent as an address to table 32 and the corresponding n bit word stored therein is read out.

In this case the two n bit words read out from table 32 and table 26 (this latter word being identified as previously described in connection with the embodiment of FIG. 2) are added to the current contents of register 28. Again, when factors A(x) and C(x) are totally scanned, register 28 contains the final result.

It will be appreciated that by resorting to the arrangement of FIG. 3, the number of look-up tables is reduced from three to two (namely RAM 32 and ROM 26), which further speeds up operation of the unit as a whole.

The arrangement of FIG. 4 shows a further alternative embodiment of the invention.

Again, the same reference numerals already used in FIGS. 2 and 3 have been adopted in FIG. 4 to reproduce elements/components which are identical/equivalent to those already described.

The embodiment of FIG. 4, the tables 10 (TAB B(x)), 12 (TAB D(x)) and 26 (TAB $\phi(x)$) of the embodiment of FIG. 2 are consolidated to a single table TAB BD$\phi$(x) in a memory 36, table TAB BD$\phi$(x) including $2^{3k}$ words of n bits each. Table TAB BD$\phi$(x) contains all the three-by-three sums, in all possible ways, of the digital words included in tables TAB B(x), TAB D(x), and TAB $\phi$(x) of FIG. 2.

In operation, table TAB BD$\phi$(x) in memory 36 is first initialized and the h-th word, with $0 \leq h \leq 2^{3k}-1$ of table 36 is obtained as a consolidated combined digital word in the following way: (word of index i of TAB BD(x))+(word of index j of TAB $\phi$(x)), where integers i, j with $0 \leq i \leq 2^{2k}-1$ e $0 \leq j \leq 2^k-1$ are related to h in the following way: $h=i+j \times 2^{2k}$.

As in the previous embodiments, factors A(x) and C(x) loaded in registers 10 and 12 are shifted by k positions. As in the embodiment of FIG. 3, the k most significant bits are extracted and concatenated by obtaining a $2^k$ bit word.

The contents of register 28 is shifted by k positions. The k most significant bits are extracted while introducing k "0" bits in the k least significant positions of the register. The k most significant bits of the 2k bit words obtained by extracting and concatenating factors A(x) and C(x) are concatenated thus obtaining 3k bit words. This 3k bit words is sent as an address to table 36 and the corresponding n bit digital word stored therein is read to be added to the current contents of register 28.

Again, once factors A(x) and C(x) have been finally scanned, register 28 contains the final result.

In the arrangement of FIG. 4, the inner product loop contains only a single partial addition. The number of look-up tables is reduced from two to one which further increase speed of operation of the unit.

All the arrangements shown in FIGS. 2 to 4 can be further optimized to reduce the size of the various look-up tables shown therein by judiciously choosing the representation for the underlying Galois field.

In generals terms, table 26 (FIGS. 2 and 3) is fixed, or varies only seldom (when the representation of the finite field is changed or in the case of reconfiguration of the system). Consequently, it can be preferably implemented by means of ROM or an EPROM.

Tables 11 and 16 of FIG. 2 generally vary at each inner product calculation. Therefore they must be preferably implemented by means of RAMs, the same also applying to tables 32 and 36.

However, certain cases may occur where factors B(x) and D(x) are fixed, or change only quite rarely (this may be the case if the representation of the finite field is changed or if the system is subject to reconfiguration). Under these circumstances, all tables 14, 16, 32 and 36 can be implemented in the form of ROMs or EPROMs, which generally have a lower cost than RAMs.

It will be appreciated that factors B(x) and D(x) play a role in computing the inner (scalar) product when they are used to initialize the various tables; after this they no longer play any role in computation. Conversely, factors A(x) and C(x) play no role in table initialization, but are stored in the respective registers 10, 12 to be used during calculation.

In the embodiment of FIG. 2, three additions must be computed for each cycle. In the arrangement of FIG. 3, two additions must be computed for each cycle. Finally, in the arrangement of FIG. 4 a single addition must be implemented for each cycle. Consequently, the clock frequency must be increased when passing from the embodiment of FIG. 2 to the embodiment of FIG. 4 while also the computing speed increases accordingly. Initialization of tables 14, 16, 26, 32 and 36 (when their contents is not fixed or varies only seldom) can be effected by software means or by means of associated hardware, e.g. by resorting to an additional initialization unit (not shown).

The solution disclosed can be easily extended to calculating inner products of vectors including more than two elements. Also, the arrangement of the invention is also adapted for use as multiplier of scalar entities, while permitting use also as a current finite field multiplier.

In the embodiment shown in FIGS. 2 and 3 the size of table 26 can be significantly reduced by judiciously selecting the generator polynomial $\phi(x)$ of the finite field. In fact, the word size in table 26 can be reduced by passing from n-bit words to m-bit words with m possibly being about one tenth of n for values of n in the vicinity of 200 bits. In that way, the overall size of table TAB $\phi(x)$ becomes almost negligible with respect to the sizes of tables 14, 16 or 32, thus permitting additional optimization measures to be taken by virtually dispensing with memory 26 as a distinct component.

The present invention has been described with reference to the preferred embodiments. However, the present invention is not limited to those embodiments. Various changes and modifications may be made within the spirit and scope of the appended claims.

The invention claimed is:

1. A circuit for use in a cryptosystem for computing a scalar product of a plurality of vectors in a finite Galois field identified by a generator polynomial, each vector including at least a first and a second element belonging to the finite Galois field, the circuit comprising:
    at least one input register for storing a plurality of digital signals representative of the first element of each of the plurality of vectors;
    at least one look-up table for storing a plurality of digital words representing a plurality of combinations and reductions of the first and second elements of the plurality of vectors, each of the plurality of digital words being a function of the second elements of the plurality of vectors and the generator polynomial, the at least one look-up table cooperating with said at least one input register partial product results each identified by at least one of the plurality of digital words stored in said at least one look-up table and based upon the plurality of digital signals stored in said at least one input register; and
    an accumulator unit for adding the partial product results to give the scalar product of the plurality of vectors in the finite Galois field identified by the generator polynomial of the cryptosystem based upon an accumulation of the partial product results.

2. A circuit according to claim 1, wherein said at least one input register is configured to be scanned, and wherein said at least one input register and said at least one look-up table cooperate until the scanning of the plurality of digital signals is completed, whereby upon completion of the scanning said accumulator unit contains the scalar product.

3. A circuit according to claim 1, wherein said at least one input register comprises first and second input registers, the first input register for storing a digital signal representative of a first element of one of the plurality of vectors and the second input register for storing a digital signal representative of a first element of another of the plurality of vectors.

4. A circuit according to claim 1, wherein the at least one look-up table comprises:
    a first look-up table for storing first digital words generated as a function of the second element of one of the plurality of vectors and the generator polynomial;
    a second look-up table for storing second digital words generated as a function of the second element of another of the plurality of vectors and the generator polynomial;
    a third look-up table for storing third digital words generated as a function of the generator polynomial and corresponding to at least one of the plurality of reductions; and
    wherein said first, second and third look-up tables cooperate with said at least one input register so that:
    a first address for said first look-up table is generated as a function of one of the plurality of digital signals representative of the first element of one of the plurality of vectors stored in said at least one input register and a first digital word is read out from said first look-up table at the first address,
    a second address for said second look-up table is generated as a function of another of the plurality of digital signals representative of the first element of another of the plurality of vectors stored in said at least one input register and a second digital word is read out from said second look-up table at the second address,
    a third address for said third look-up table is generated as a function of contents of said accumulator unit and a third digital word is read out from said third look-up table at the third address, and
    the first, second and third digital words are added to the contents of said accumulator unit.

5. A circuit according to claim 4, wherein the first, second and third addresses are generated as a result of a shift operation in said at least one input register and in said accumulator unit.

6. A circuit according to claim 4, wherein said at least one input register comprises a first input register for storing a digital signal representative of one of the plurality of vectors and a second input register for storing a digital signal representative of another of the plurality of vectors.

7. A circuit according to claim 1, wherein said at least one look-up table comprises:
    a first look-up table for storing first combined digital words representative of all possible two-by-two sums of digital words generated as a function of the second element of one of the plurality of vectors and said generator polynomial, and digital words generated as a function of the second element of another of the plurality of vectors and said generator polynomial, a second look-up table for storing second digital words generated as a function of said generator polynomial and corresponding to at least one of the plurality of reductions; and wherein said first and second look-up tables cooperate with said at least one input register so that:

a first address for said first look-up table is generated as a function of a concatenation of two digital signals stored in said at least one input register, one of the two digital signals being representative of the first element of one of the plurality of vectors and another of the two digital signals being representative of the first element of another of the plurality of vectors, and a first digital word is read out from said first look-up table at the first address, a second address for said second look-up table is generated as a function of contents of said accumulator unit and a second digital word is read out from said second look-up table at said second address, and the first and second digital words are added to the contents of said accumulator unit.

8. A circuit according to claim 7, wherein the first and second addresses are generated as a result of a shift operation in said at least one input register and in said accumulator unit.

9. A circuit according to claim 7, wherein said at least one input register comprises a first input register for storing a digital signal representative of a first element of one of the plurality of vectors and a second input register for storing a digital signal representative of a first element of another one of the plurality of vectors.

10. A circuit according to claim 1, wherein said at least one look-up table comprises:

a single look-up table storing consolidated combined digital words representative of all the possible three-by-three sums of first digital words generated as a function of the second element of one of the plurality of vectors and the generator polynomial, second digital words generated as a function of the second element of another of the plurality of vectors and the generator polynomial, and third digital words generated as a function of the generator polynomial and corresponding to at least one of the plurality of reductions; and wherein said single look-up table cooperates with said at least one input register so that:

a first address generating word is generated as a function of the concatenation of two digital signals stored in said at least one input register, one of the two digital signals being representative of the first element of one of the plurality of vectors and the other of the two digital signals being representative of the first element of the other of the plurality of vectors, and a first digital word is read out from said first look-up table, a second address generating word is generated as a function of contents of said accumulator unit and a second digital word is read out from said second look-up table, a third address is generated by concatenating the first and second address generating words and a third digital word is read out of said single look-up table at the third address, and the third digital word is added to the contents of said accumulator unit.

11. A circuit according to claim 10, wherein said first and second address generating words are generated as a result of a shift operation in said at least one input register and in said accumulator unit.

12. A circuit according to claim 10, wherein said at least one input register comprises a first input register for storing a digital signal representative of a first element of one of the plurality of vectors and a second input register for storing a digital signal representative of a first element of another of the plurality of vectors.

13. A circuit for use in a cryptosystem for computing a scalar product of a plurality of vectors in a finite Galois field identified by a generator polynomial, each vector including at least a first and a second element belonging to the finite field, the circuit comprising:

at least one input register for storing digital signals representative of the first element of each of the plurality of vectors;

at least one look-up table for storing a plurality of digital words, each of the plurality of digital words based on the second elements of the plurality of vectors and the generator polynomial, the at least one look-up table cooperating with said at least one input register to generate at least two partial product results identified by the plurality of digital words stored in said at least one look-up table and based upon at least two digital signals stored in said at least one input register; and an accumulator unit for adding the at least two partial product results to give the scalar product of the plurality of vectors in the finite Galois field identified by the generator polynomial of the cryptosystem.

14. A circuit according to claim 13, wherein the at least one look-up table comprises:

a first look-up table for storing first digital words based on the second element of one of the plurality of vectors and the generator polynomial;

a second look-up table for storing second digital words based on the second element of another of the plurality of vectors and the generator polynomial;

a third look-up table for storing third digital words based on the generator polynomial; and wherein said first, second and third look-up tables cooperate with said at least one input register so that:

a first address for said first look-up table is generated based on the first element of one of the plurality of vectors and a first digital word is read out from said first look-up table at the first address, a second address for said second look-up table is generated based on the first element of another of the plurality of vectors and a second digital word is read out from said second look-up table at the second address, a third address for said third look-up table is generated based on contents of said accumulator unit and a third digital word is read out from said third look-up table at the third address, and the first, second and third digital words are added to the contents of said accumulator unit.

15. A circuit according to claim 13, wherein said at least one look-up table comprises:

a first look-up table for storing first combined digital words representative of a two-by-two sum of a digital word based on the second element of one of the plurality of vectors and said generator polynomial, and a digital word based on the second element of another of the plurality of vectors and said generator polynomial;

a second look-up table for storing second digital words generated as a function of said generator polynomial; and wherein said first and second look-up tables cooperate with said at least one input register so that:

a first address for said first look-up table is generated based on a concatenation of two digital signals stored in said at least one input register, one of the two digital signals being representative of the first element of one of the plurality of vectors and another of the two digital signals being representative of the first element of another of the plurality of vectors, and a first digital word is read out from said first look-up table at the first address, a second address for said second look-up table is generated based on contents of said accumulator unit and a second digital word is read out from said second look-up table at said second address, and the first and second digital words are added to the contents of said accumulator unit.

16. A circuit according to claim 13, wherein said at least one look-up table comprises:

a single look-up table for storing consolidated combined digital words representative a three-by-three sum of a first digital word based on the second element of one of the plurality of vectors and the generator polynomial, a second digital word based on the second element of another of the plurality of vectors and the generator polynomial, and a third digital word based on the generator polynomial; and wherein said single look-up table cooperates with said at least one input register so that:

a first address generating word is generated as a function of the concatenation of two digital signals stored in said at least one input register, one of the two digital signals being representative of the first element of one of the plurality of vectors and the other of the two digital signals being representative of the first element of the other of the plurality of vectors, and a first digital word is read out from said first look-up table, a second address generating word is generated as a function of contents of said accumulator unit and a second digital word is read out from said second look-up table, a third address is generated by concatenating the first and second address generating words and a third digital word is read out of said single look-up table at the third address, and the third digital word is added to the contents of said accumulator unit.

17. A method for computing an inner product of a plurality of vectors belonging to a set identified by a generator polynomial for use in a cryptosystem, each said vector having at least a first and a second element belonging to said set, the circuit comprising:

providing at least one input register for storing digital signals representative of the first element of each of the plurality of vectors;

configuring at least one look-up table to store digital words based on the second elements of each of the plurality of vectors and the generator polynomial, and to cooperate with said at least one input register to generate partial product results each identified by at least one of said digital words addressed in said at least one look-up table; and summing the partial product results in an accumulator unit to give the inner product of the plurality of vectors in the finite Galois field identified by the generator polynomial of the cryptosystem deriving from accumulation of said partial results.

18. A method according to claim 17, further comprising scanning said at least one input register and detecting the condition of digital signals representative of the first element of the plurality of vectors; configuring said at least one look-up table to cooperate until the scanning of the digital signals is completed; and providing the scalar product in the accumulator unit upon completion of the scanning.

19. A method according to claim 17, wherein configuring at least one look-up table comprises:

configuring a first look-up table for storing first digital words based on the second element of one the plurality of vectors and the generator polynomial;

configuring a second look-up table for storing second digital words based on the second element of another of the plurality of vectors and the generator polynomial;

configuring a third look-up table for storing third digital words based on the generator polynomial and corresponding to at least on reduction with respect to said generator polynomial; and configuring said first, second and third look-up tables to cooperate with said at least one input register such that:

a first address for said first look-up table is generated based on digital signals representative of the first element of one of the plurality of vectors and a first digital word is read out from said first look-up table at said first address, a second address for said second look-up table is generated based on digital signals representative of the first element of another of the plurality of vectors and a second digital word is read out from said second look-up table at said second address, a third address for said third look-up table is generated based on the contents of said accumulator unit and a third digital word is read out from said third look-up table at said third address, and the first, second and third digital words are added to the contents of said accumulator unit.

20. A method according to claim 17, wherein configuring at least one look-up table comprises:

configuring a first look-up table for storing first combined digital words representative of a two-by-two sum of a first digital word based on the second element of one of the plurality of vectors and the generator polynomial and a second digital word based on the second element of another of the plurality of vectors and the generator polynomial;

configuring a second look-up table for storing second digital words based on said generator polynomial and corresponding to at least one reduction with respect to said generator polynomial; and configuring said first and second look-up tables to cooperate with said at least one input register such that:

a first address for said first look-up table is generated based on the concatenation of two digital signals, one of the two digital signals representative of the first element of one of the plurality of vectors and the other of the two digital signals representative of another of the plurality of vectors, and a first digital word is read out from said first look-up table at said first address, a second address for said second look-up table is generated based on the contents of said accumulator unit and a second digital word is read out from said second look-up table at said second address, and said first and second digital words are added to the contents of said accumulator unit.

21. A method according to claim 17, wherein configuring at least one look-up table comprises:

configuring a single look-up table for storing consolidated combined digital words representative of a three-by-three sum of a first digital word based on the second element of one of the plurality of vectors and the generator polynomial, a second digital word based on the second element of another of the plurality of vectors and said generator polynomial, and third digital words based on the generator polynomial and corresponding to at least one reduction with respect to the generator polynomial; and configuring said single look-up table to cooperate with said at least one input register such that:

a first address generating word is generated based on the concatenation of two digital signals, one of the two digital signals being representative of the first element of one of the plurality of vectors and the other of the two digital signals being representative of the first element of the other of the plurality of vectors, and a first digital word is read out from said first look-up table at said first address, a second address generating word is generated based on the contents of said accumulator unit and a second digital word is read out from said second look-up table at said second address, a single address is generated by concatenating the first and second address generating words and a single digital word is read out of said single look-up table at said single address, and said single digital word is added to the contents of said accumulator unit.

* * * * *

UNITED STATES PATENT AND TRADEMARK OFFICE
CERTIFICATE OF CORRECTION

PATENT NO. : 7,206,410 B2
APPLICATION NO. : 09/974176
DATED : April 17, 2007
INVENTOR(S) : Bertoni et al.

It is certified that error appears in the above-identified patent and that said Letters Patent is hereby corrected as shown below:

| | |
|---|---|
| Column 3, Line 31 | Delete: "Such reduction" <br> Insert: --Such a reduction-- |
| Column 3, Line 32 | Delete: "designate" <br> Insert: --designates-- |
| Column 3, Line 35 | Delete: "remain" <br> Insert: --remainder-- |
| Column 3, Line 40 | Delete: "in compact" <br> Insert: --in a compact-- |
| Column 3, Line 53 | Delete: "contrasts" <br> Insert: --contrast-- |
| Column 3, Line 67 | Delete: "one as" <br> Insert: --one has-- |
| Column 4, Lines 12-13 | Delete: "using combination" <br> Insert: --using in combination-- |
| Column 4, Line 13 | Delete: "In such" <br> Insert: --Such-- |
| Column 4, Line 14 | Delete: "memorising" <br> Insert: --memorizing-- |
| Column 4, Line 15 | Delete: "is read" <br> Insert: --are read-- |
| Column 4, Line 16 | Delete: "with purpose" <br> Insert: --with the purpose-- |
| Column 4, Line 63 | Delete: "serious" <br> Insert: --series-- |
| Column 6, Line 37 | Delete: "e" <br> Insert: --and-- |
| Column 6, Line 58 | Delete: "increase" <br> Insert: --increases-- |

UNITED STATES PATENT AND TRADEMARK OFFICE
CERTIFICATE OF CORRECTION

PATENT NO. : 7,206,410 B2
APPLICATION NO. : 09/974176
DATED : April 17, 2007
INVENTOR(S) : Bertoni et al.

It is certified that error appears in the above-identified patent and that said Letters Patent is hereby corrected as shown below:

| | |
|---|---|
| Column 7, Line 26 | Delete: "is not fixed or varies" <br> Insert: --are not fixed or vary-- |
| Column 7, Line 27 | Delete: "effected" <br> Insert: --affected-- |
| Column 11, Line 28 | Delete: "representative a" <br> Insert: --representative of a-- |
| Column 12, Line 11 | Delete: "element" <br> Insert: --elements-- |
| Column 12, Line 19 | Delete: "one the" <br> Insert: --one of the-- |
| Column 12, Line 26 | Delete: "at least on" <br> Insert: --at least one-- |

Signed and Sealed this

Second Day of October, 2007

JON W. DUDAS
*Director of the United States Patent and Trademark Office*